U. S. JENKINS & J. G. BROMAN.
WHEEL.
APPLICATION FILED MAY 25, 1908.
921,996.
Patented May 18, 1909.
2 SHEETS—SHEET 1.
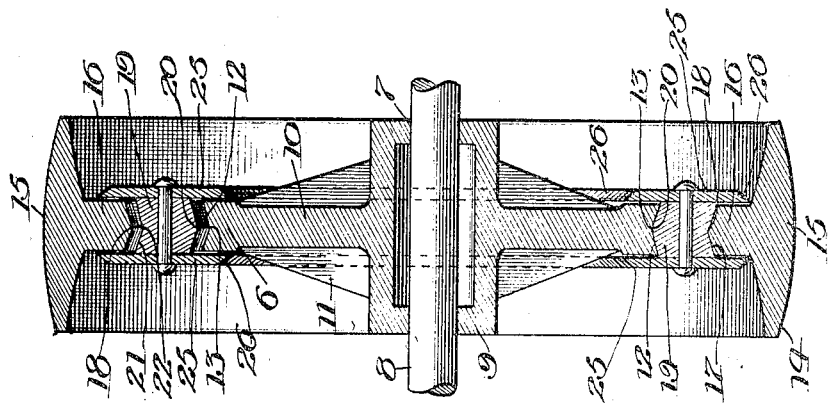
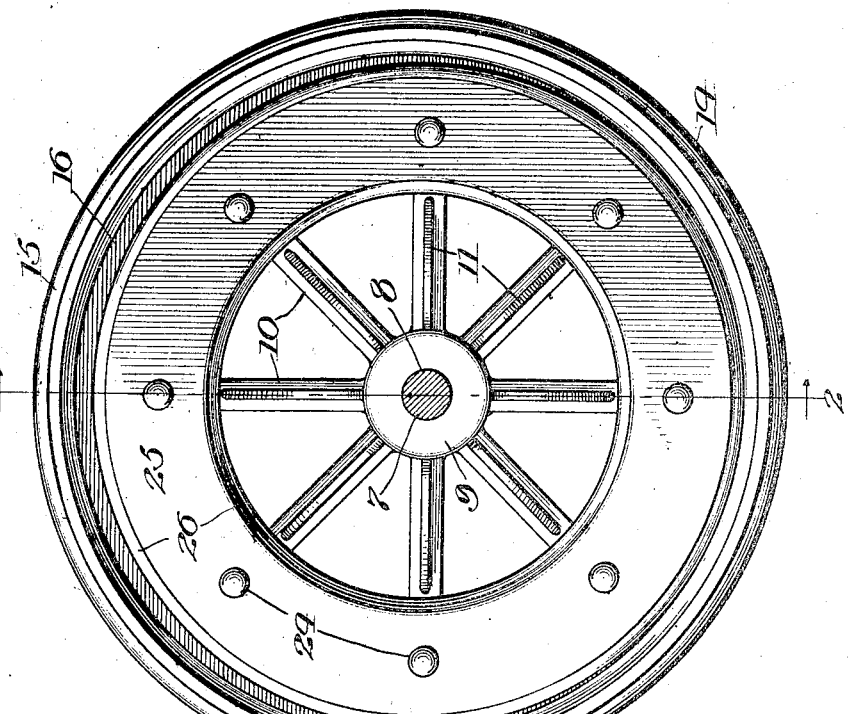

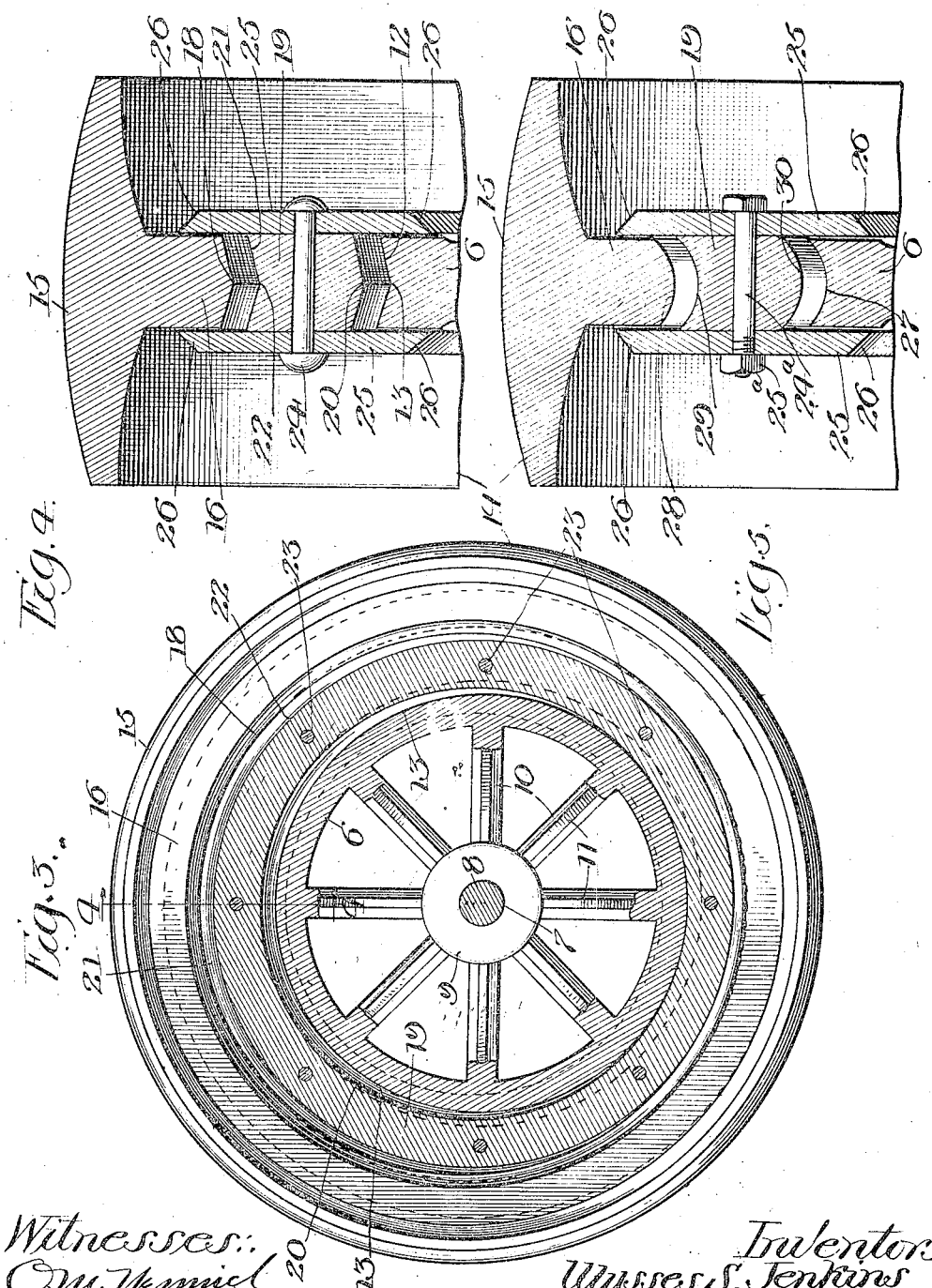

UNITED STATES PATENT OFFICE.

ULYSSES S. JENKINS AND JOHN G. BROMAN, OF CHICAGO, ILLINOIS.

WHEEL.

No. 921,998.

Specification of Letters Patent.

Patented May 18, 1909.

Application filed May 25, 1908. Serial No. 434,881.

*To all whom it may concern:*

Be it known that we, ULYSSES S. JENKINS and JOHN G. BROMAN, citizens of the United States, residing at Chicago, in the county of Cook and State of Illinois, have invented certain new and useful Improvements in Wheels, of which the following is a specification.

This invention relates to certain new and useful improvements in wheels, and while more particularly to that class of small wheels to be used on trucks or other small vehicles or carriages, yet it is applicable to and may be embodied in wheels of larger sizes and for various kinds of vehicles, as well as for other purposes, without departing from the principles and spirit of the invention.

The main objects of the invention are to provide a wheel which shall be strong, durable and efficient, the parts of which shall be so constructed and arranged with respect to one another as to afford a registering alining or centering effect of several of the rotatable elements in a vertical plane at right angles to the axle, to the end that friction between the means for preventing lateral movement of the rotatable elements and the same will be greatly reduced or almost entirely avoided, and also to attain the greatest ease and simplicity in its manufacture, yet so as to afford great strength at the places required, and which wheel shall comprise means for keeping the weight of the truck or carriage while subject to a pushing or pulling force slightly forward of the wheel-base with respect to the motion, thus utilizing the weight of and upon the truck or vehicle to increase the effectiveness of the propelling force applied to the axle of the wheel.

Another important object of the invention is to provide a wheel of such construction that, if in the progress of the truck or vehicle on which it is mounted an obstruction is encountered by the tire or outer rotating element, the propelling force will be raised or directed to about a horizontal line through the axle in the direction of the motion.

Various other objects and advantages of the invention will be disclosed in the subjoined description and explanation.

In order to enable others skilled in the art to which our invention pertains, to make and use the same, we will now proceed to describe it, referring to the accompanying drawings, in which—

Figure 1 is a view in side elevation of a wheel embodying the invention; Fig. 2 is a vertical sectional view taken on line 2—2 of Fig. 1 looking in the direction indicated by the arrows, and illustrating the spaces between the side plates and rotatable elements as exaggerated; Fig. 3 is a face view partly in section and partly in elevation of the wheel, showing the parts in the positions illustrated in Fig. 1; Fig. 4 is an enlarged fragmental vertical sectional view taken on line 4—4 of Fig. 3; and Fig. 5 is a similar view of like parts, showing a modification in the construction of the wheel.

Like numerals of reference, refer to corresponding parts throughout the different views of the drawings.

The reference numeral 6 designates the body or inner rotating element of the wheel which is provided with a central opening 7 for the reception of the axle 8 upon which it may be mounted, in the usual or any well-known way. The hub portion 9 of the inner element is provided with a series of spokes 10 which are preferably strengthened by means of ribs 11 formed on each side thereof, which ribs taper from the hub portion 9 outwardly to near the outer ends of the spokes 10, which spokes connect the annular portion 6 with the hub 9, as will be understood by reference to the different views of the drawings. The element 6 is provided with a peripheral groove 12 which is angular in cross-section and has its apex 13 at the middle of the rim of the element 6, or at a point equidistant between its sides. The sides of the inner element near its periphery are preferably flat and in parallelism with one another from near the ends of the ribs 11 outwardly, so that said element may fit snugly, but movably, between the side plates used for holding the inner and outer elements in alinement with one another, as will be presently explained. Surrounding the periphery of the inner element at a distance therefrom is an outer rotatable element, which is designated as a whole by the reference numeral 14, and said outer element comprises a circular ring or band 15, the outer periphery of which is curved in cross-section, as shown, so that if placed on a flat surface its edges will not impinge against the same. The band or ring 15 of the outer element is provided on its inner surface midway between its edges with an inwardly projecting annular extension 16, the inner surface of which extension is formed angular in cross-section as at 17 with the apex 18 of said angle located midway between the sides of the extension 16, as will be clearly understood by reference to Figs. 2 and 4 of the drawings.

Interposed between the periphery of the inner element 6 and the inner periphery of the extension 16 on the outer rotatable element is an intermediate rotatable element 19 which is in the form of a ring and of greater diameter than the inner element 6 and of less diameter than the extension 16 of the outer element. The inner and outer peripheries of the intermediate element 19 are angular in cross-section, that is to say, the inner periphery of said element has the apex 20 of its angular surface midway between the sides of said element, and extended inwardly so as to fit in the angular groove 12 of the inner element, and in such a manner that the apexes 13 and 20 of the angular portions of the inner and intermediate elements, respectively, will coincide in a vertical plane. The outer surface or periphery of the element 19 is provided with an angular groove 21, the apex 22 of which will receive the apex 18 of the angular surface of the extension 16 of the outer element in the movement of the parts. The intermediate element or ring 19 is provided with a series of transverse openings 23 in which are located rivets or bolts 24 used for securing the side plates 25 to the sides of the element 19, which side plates are in the form of flat rings and preferably have their edges inwardly beveled as at 26, for the purpose of preventing dust, dirt and other material finding its way between said plates and the inner and outer elements.

In Fig. 5 of the drawings is shown a modification in the construction of the wheel, which consists in providing the element 6 with a peripheral groove 27, which is curved in cross-section, and in providing the extension 16 on the band or ring 15 of the outer element with a curved inner periphery 28, instead of an angular inner periphery as in the other construction. In this modified form of the wheel the intermediate element 19 has its outer periphery formed with a curved groove 29 to correspond with the curved groove 27 in the periphery of the inner element. In other respects the modified form of the wheel is the same as that shown in the other views of the drawings and above-described, except that bolts 24ᵃ and nuts 25ᵃ thereon may be used for securing the plates 25 in position on the sides of the intermediate element.

From the foregoing and by reference to the drawings it will be understood and clearly seen that, the inner and outer rotating elements 6 and 14, respectively, as well as the intermediate element 19, will have separate axes of rotation and differential speeds, but will coöperate in supporting the weight of the load, the inner one of said elements supporting the axle and the weight upon the intermediate and outer elements, and that the latter will provide the wheel-base with respect to the floor or surface upon which the wheel travels. It is also apparent that, by forming the peripheral groove in the inner element so that its deepest point will be midway between the sides thereof, and by forming the intermediate element with its inner periphery of a corresponding shape or form as that of the groove in the inner element and its outer periphery with a groove the deepest point of which will be midway between the sides of the intermediate element, and by forming the inner periphery of the extension 16 on the outer element of a shape to correspond with the outer peripheral groove of the intermediate element, said elements, in the rotation of the wheel, will be caused to register or aline with one another in a vertical plane, thus reducing or almost entirely eliminating the friction incident to the side plates 25 and the inner and outer elements.

In Figs. 2, 4 and 6 of the drawings, we have shown the spaces between the side plates 25 and the sides of the inner and outer elements as being exaggerated, but it will be understood that said spaces are very slight, in fact, will be almost infinitesimal, but so as to permit of the movement of said elements between the plates. By curving the outer surface of the band or ring 15, as shown, it is evident that the edges thereof will be slightly raised from the floor so as to prevent the same being cut or worn as the wheel passes thereover.

It is obvious that numerous modifications of minor details of the improved wheel may be employed, and for this reason we do not desire to limit ourselves to the specific construction herein shown and described.

Having thus fully described our invention, what we claim as new, and desire to secure by Letters-Patent, is—

1. In a wheel, the combination with an inner rotating element provided with a peripheral groove having its deepest point midway between the sides of said element, an intermediate element having its inner periphery formed to correspond with the shape of the peripheral groove in the inner element and rotatable within said groove and independently of said inner element and having its outer periphery provided with a groove having its deepest point midway between the sides of said intermediate element, and an outer element having its inner periphery formed to correspond with the peripheral groove of the intermediate element and rotatable within said groove and independently of said element.

2. In a wheel, the combination with an inner rotating element provided with a peripheral groove having its deepest point midway between the sides of said element, an intermediate element having its inner periphery formed to correspond with the shape of the peripheral groove in the inner element and rotatable within said groove and independently of said inner element and provided with a groove in its outer periphery having its deepest point midway between the sides thereof, an outer element having its inner periphery formed to correspond with the outer peripheral groove of the intermediate element and rotatable within said groove and independently of said intermediate element, and means on each of the sides of the intermediate element to overlap the sides of the inner and outer elements.

3. In a wheel, the combination with an inner rotating element provided with an angular peripheral groove having its apex midway between the sides of said element, an intermediate element having its inner periphery formed to correspond with the peripheral groove of the inner element and rotatable within said groove and independently of said inner element and provided on its outer periphery with an angular groove having its deepest point midway between the sides of said element, and an outer element having its inner periphery formed to correspond with the outer peripheral groove in the intermediate element and rotatable within said groove and independently of said intermediate element.

4. In a wheel, the combination with an inner rotating element provided with an angular groove having its apex midway between the sides of said element, an intermediate element having its inner periphery formed to correspond with the peripheral groove of the inner element and rotatable within said groove and independently of said inner element and provided in its outer periphery with an angular groove having its apex midway between the sides of said element, an outer element having its inner periphery formed to correspond with the groove in the outer periphery of the intermediate element and rotatable within said groove and independently of said element, and a ring-like plate secured to each side of the intermediate element and overlapping the sides of the inner and outer elements.

ULYSSES S. JENKINS.
JOHN G. BROMAN.

Witnesses:
  CHAS. C. TILLMAN,
  M. A. NYMAN.